(12) United States Patent
Aung et al.

(10) Patent No.: US 12,450,830 B2
(45) Date of Patent: Oct. 21, 2025

(54) METHODS AND SYSTEMS FOR ESTIMATING PHYSICAL PROPERTIES OF OBJECTS

(71) Applicant: Panasonic Intellectual Property Management Co., Ltd., Osaka (JP)

(72) Inventors: Nway Nway Aung, Singapore (SG); Ariel Beck, Singapore (SG); Sahim Yamaura, Singapore (SG); Muhammad Usman, Singapore (SG); Andre Ivan, Singapore (SG); Zong Sheng Tang, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 133 days.

(21) Appl. No.: 18/586,124

(22) Filed: Feb. 23, 2024

(65) Prior Publication Data

US 2025/0272912 A1    Aug. 28, 2025

(51) Int. Cl.
| G06T 17/00 | (2006.01) |
| B25J 9/16 | (2006.01) |
| G06T 11/60 | (2006.01) |

(52) U.S. Cl.
CPC ............ G06T 17/00 (2013.01); B25J 9/1669 (2013.01); G06T 11/60 (2013.01)

(58) Field of Classification Search
CPC ......... G06T 17/00; G06T 11/60; B25J 9/1669
See application file for complete search history.

(56) References Cited

U.S. PATENT DOCUMENTS

| 2013/0335528 A1* | 12/2013 | Vishwanath ............ G06T 17/00 348/46 |
| 2015/0062120 A1* | 3/2015 | Reisner-Kollmann ........................ G06T 19/006 345/419 |
| 2015/0371391 A1* | 12/2015 | Ding ........................ G06T 7/593 382/141 |
| 2017/0193699 A1* | 7/2017 | Mehr ........................ G06T 7/149 |

(Continued)

OTHER PUBLICATIONS

Wang, Zhihua, "3D-PhysNet: Learning the Intuitive Physics of Non-Rigid Object Deformations", 2018, arVix, pp. 1-7 (Year: 2018).*

(Continued)

*Primary Examiner* — Terrell M Robinson
(74) *Attorney, Agent, or Firm* — Rimon P.C.

(57) ABSTRACT

The present disclosure relates to a method for estimating physical properties of an object. The method includes generating a three-dimensional (3D) reconstruction of a real-world environment based on an input media. Further, the method includes estimating a current set of physical parameters of the object using a physics-based prediction model and a real-world visual content while the object is manipulated. Further, the method includes generating a simulation variant and computing a cost function based on comparing the simulation variant and the real-world visual content. Furthermore, the method includes estimating the physical properties of the object based on optimizing the current set of physical parameters with the cost function such that a similarity between the simulation variant and the real-world visual content increases.

18 Claims, 10 Drawing Sheets

(56) References Cited

U.S. PATENT DOCUMENTS

2020/0118342 A1* 4/2020 Varshney ................ G06T 13/20
2022/0343537 A1* 10/2022 Taamazyan ............ G06V 10/82

OTHER PUBLICATIONS

Arriola-Rios, Veronica E., "Modeling of Deformable Objects for Robotic Manipulation: A Tutorial and Review", 2020, Frontiers in Robotics and AI, vol. 7, pp. 1-25 (Year: 2020).*

Vincent Lim et al., "Real2Sim2Real: Self-Supervised Learning of Physical Single-Step Dynamic Actions for Planar Robot Casting", 2022 IEEE International Conference on Robotics and Automation (ICRA), May 23-27, 2022, pp. 8282-8289.

\* cited by examiner

METHODS AND SYSTEMS FOR ESTIMATING PHYSICAL PROPERTIES OF OBJECTS

FIELD OF THE INVENTION

The present disclosure relates generally to computer vision systems, and more specifically, to methods and systems for estimating physical properties associated with the object.

BACKGROUND

Computer Vision has witnessed remarkable advancements in recent years, becoming an integral part of various industries, from healthcare to manufacturing. However, a critical bottleneck in the field is the resource-intensive nature of data collection, particularly when dealing with complex problems involving the modelling of physical properties, especially for flexible objects.

Data collection is a fundamental aspect of training machine learning models, especially in the domain of Computer Vision. The need for vast amounts of labelled data becomes particularly challenging when dealing with complex problems that involve capturing the physical properties of objects, especially those that are flexible. The data collection process becomes not only time-consuming but also financially burdensome, contributing to the bottleneck in advancing Computer Vision applications specifically for flexible objects.

Furthermore, flexible objects pose a unique set of challenges for Computer Vision systems. Unlike rigid structures, flexible objects deform and change shape under various conditions, making it difficult to accurately model their physical properties. When addressing complex issues that require capturing the physical properties of objects, particularly flexible objects, the demand for extensive amounts of labeled data becomes apparent. This necessity poses significant challenges, as the data collection process is not only time-intensive but also imposes financial constraints. Consequently, these challenges contribute to a bottleneck in the progression of Computer Vision applications, especially those aimed at addressing the unique characteristics of flexible objects. The existing techniques often fall short to tackle challenges related to data collection, 3D model generation, the estimation of physical properties of flexible objects, and real-world deployment or applications of the Computer Vision systems, thus, leading to a gap in the understanding of the flexible object's behaviour.

Furthermore, the repercussions of inaccurate physical property estimation in Computer Vision extend to real-world applications, particularly in industries relying on precision and reliability. For instance, in industrial visual inspection, a critical component of quality control in manufacturing processes may suffer from inaccuracies if the flexible objects are not appropriately modelled. For another instance, in industrial welding and positioning, where precise alignment and control are paramount, the use of flawed 3D models may lead to errors in execution, thus compromising the integrity of the entire operation. For another instance, industries reliant on robotic manipulation to handle liquids or chemicals may encounter challenges like spillage or laboratory accidents if the precise physical properties of the flexible objects containing these substances are not properly identified. Therefore, within such contexts, visual examination of flexible objects becomes crucial, especially for industries utilizing automated robotics.

Additionally, the inaccuracies in estimating physical properties create a domino effect, impacting the overall performance and reliability of Computer Vision models. As these models are deployed in various industrial settings, the consequences of inaccurate predictions can be severe, affecting not only efficiency but also safety. Industries that heavily rely on Computer Vision for automated processes may witness a cascading effect, with errors in one stage propagating through the entire workflow.

Thus, there is a need to address the challenge of expensive data collection and inaccurate physical property estimation for the flexible objects in Computer Vision. Further, the obstacle presented by the intricate nature of estimating physical properties, despite the availability of large datasets may be another challenge. Even with large datasets, the task of reliably determining the diverse and specific physical characteristics of flexible objects remains a daunting task, filled with complexities and uncertainties.

Further, in another challenge with the existing techniques, developing automated mechanisms to generate extensive simulated datasets is essential. Overcoming the scarcity of data requires the implementation of sophisticated methodologies capable of autonomously producing large datasets of simulated data. This process may be vital for facilitating comprehensive analysis and training within the field of Computer Vision systems.

Furthermore, transitioning from simulated environments to real-world applications, particularly concerning the deployment of models trained on simulated data in authentic operational settings may be yet another challenge for the existing techniques. It may be required to create a bridge between simulation and reality environments by developing robust frameworks and methodologies that may effectively translate the insights from simulated environments into practical solutions that are robust and adaptable in real-world scenarios.

Therefore, there is a need for a solution to address the aforementioned issues and challenges.

SUMMARY

This summary is provided to introduce a selection of concepts, in a simplified format, that are further described in the detailed description of the invention. This summary is neither intended to identify essential inventive concepts of the invention nor is it intended for determining the scope of the invention.

According to an embodiment of the present disclosure, a method for estimating one or more physical properties associated with an object is disclosed. The method includes generating a three-dimensional (3D) reconstruction of a real-world environment based on an input media from an imaging device. Further, the method includes estimating a current set of physical parameters associated with the object using a physics-based prediction model and a real-world visual content indicating a recorded media while the object is manipulated in the real-world environment. Further, the method includes generating a simulation variant corresponding to the manipulation of the object based on the 3D reconstruction and the current set of physical parameters. Furthermore, the method includes computing a cost function based on comparing the simulation variant and the real-world visual content, wherein the cost function indicates the dissimilarity between the simulation variant and the real-world visual content. Furthermore, the method includes estimating the one or more physical properties associated with the object based on optimizing the current set of physical parameters with the cost function such that a similarity between the simulation variant and the real-world visual content increases.

According to an embodiment of the present disclosure, a system for estimating one or more physical properties associated with an object is disclosed. The system includes a memory and at least one processor in communication with the memory. The at least one processor is configured to generate a three-dimensional (3D) reconstruction of a real-world environment based on an input media from an imaging device. Further, the at least one processor is configured to estimate a current set of physical parameters associated with the object using a physics-based prediction model and a real-world visual content indicating a recorded media while the object is manipulated in the real-world environment. Further, the at least one processor is configured to generate a simulation variant corresponding to the manipulation of the object based on the 3D reconstruction and the current set of physical parameters. Furthermore, the at least one processor is configured to compute a cost function based on comparing the simulation variant and the real-world visual content, wherein the cost function indicates the dissimilarity between the simulation variant and the real-world visual content. Furthermore, the at least one processor is configured to estimate the one or more physical properties associated with the object based on optimizing the current set of physical parameters with the cost function such that a similarity between the simulation variant and the real-world visual content increases.

To further clarify the advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail in the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
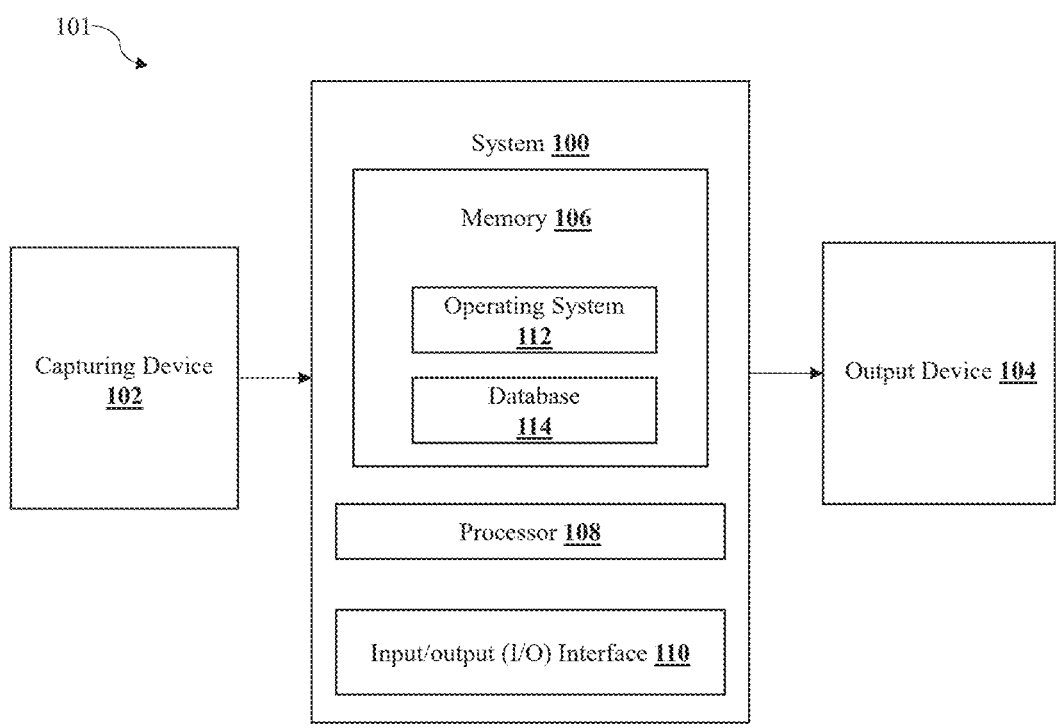
FIG. 1 illustrates an environment comprising a system for estimating physical properties associated with an object, according to an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The present disclosure proposes methods and systems for estimating physical properties of an object. The methods and systems include the automatic gathering of data for Computer Vision by employing robotic manipulation and scanning a real-world environment. Subsequently, the methods and systems produce a highly realistic 3-dimensional (3D) model of the object and estimate the physical properties of the object. Additionally, the methods and systems generate a simulated dataset by capturing the real-world environment and reconstructing it in 3D. Finally, the methods and systems facilitate real-world deployment of a trained computer vision machine learning model trained with the simulated dataset and via Domain Adaptation. Hence, the methods and systems contribute to addressing the challenges of data collection, 3D model generation, estimation of physical properties of the object and real-world deployment or application simultaneously.

FIG. 1 illustrates an environment comprising a system for estimating physical properties associated with an object, according to an embodiment of the present disclosure.

The environment 101 may further comprise an imaging device and an output device 104 communicatively coupled to the system 100. The terms 'imaging device', 'capturing device' and 'input device' may be used interchangeably in the present disclosure. The system 100 may be configured to estimate the physical properties of the object. The system 100 may be integrated within a server, a personal computing device, a user equipment, a laptop, a tablet, a mobile communication device, and so forth.

In an embodiment, the system 100 may correspond to a stand-alone system provided on an electronic device. The electronic device may include a personal computing device, a user equipment, a laptop, a tablet, a mobile communication device, or any other device capable of hosting processing and memory units. In an embodiment, the imaging device 102 and/or the output device 104 may be integrated with the electronic device hosting the system 100. In an alternate embodiment, the imaging device 102 and/or the output device 104 may be separate devices from the electronic device hosting the system 100.

In another embodiment, the system 100 may be based in a server/cloud architecture and the system 100 may be communicably coupled to the imaging device 102 and the output device 104 via a network (not shown). The network may be a communication network, a wireless network, a wired network, and the like. In another embodiment, the system 100 may be provided in a distributed manner, in that, one or more components of the system 100 may be provided in that, one or more components and/or functionalities of the system 100 are provided through an electronic device, and one or more components and/or functionalities of the system 100 are provided through a cloud-based unit, such as, a cloud storage or a cloud-based server.

In non-limiting examples, the output device 104 may include, but is not limited to, a display unit, an indicating device, a recording device, a computing device, and so forth. In an embodiment, the output device 104 may be associated with a graphical user interface, an interactive user interface, and the like.

The system 100 may include a memory 106, at least one processor 108, and an Input/Output (I/O) interface 110. In an exemplary embodiment, the at least one processor 108 may be operatively coupled to the I/O interface 110 and the memory 106.

In one embodiment, the at least one processor 108 may be operatively coupled to the memory 106 for processing, executing, or performing a set of operations. The at least one processor 108 may include at least one data processor for executing processes in Virtual Storage Area Network. In another embodiment, the at least one processor 108 may include specialized processing units such as, integrated system (bus) controllers, memory management control units, floating point units, graphics processing units, digital signal processing units, etc. In one embodiment, the processor 108 may include a Central Processing Unit (CPU), a Graphics Processing Unit (GPU), or both. In another embodiment, the at least one processor 108 may be one or more general processors, digital signal processors, application-specific integrated circuits, field-programmable gate arrays, servers, networks, digital circuits, analog circuits, combinations thereof, or other now-known or later developed devices for analyzing and processing data. The at least one processor 108 may execute a software program, such as code generated manually (i.e., programmed) to perform one or more operations disclosed in the present disclosure.

The at least one processor 108 may be disposed in communication with one or more input/output (I/O) devices, such as imaging device 102 and output device 104, via the I/O interface 110. The I/O interface 110 may employ communication code-division multiple access (CDMA), high-speed packet access (HSPA+), global system for mobile communications (GSM), long-term evolution (LTE), WiMax, or the like, etc.

In an embodiment, the at least one processor 108 may be disposed in communication with a communication network via a network interface. In an embodiment, the network interface may be the I/O interface 110. The network interface may connect to the communication network to enable connection of the system 100 with the outside environment and/or device/system. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the system 100 may communicate with other devices. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

Furthermore, the memory 106 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

The memory 106 is communicatively coupled with the processor 108 to store bitstreams or processing instructions for completing the process. Further, the memory 106 may include an operating system 112 for performing one or more tasks of the system 100, as performed by a generic operating system in the communications domain or the standalone device. In an embodiment, the memory 106 may comprise a database 114 configured to store the information as required by the processor 108 to perform one or more functions for estimating the physical properties of the object, as discussed throughout the disclosure.

The memory 106 may be operable to store instructions executable by the processor 108. The functions, acts, or tasks illustrated in the figures or described may be performed by the processor 108 for executing the instructions stored in the memory 106. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

For the sake of brevity, the architecture, and standard operations of the memory 106 and the processor 108 are not discussed in detail. In one embodiment, the memory 106 may be configured to store the information as required by the processor 108 to perform the methods described herein.

Figure 2:
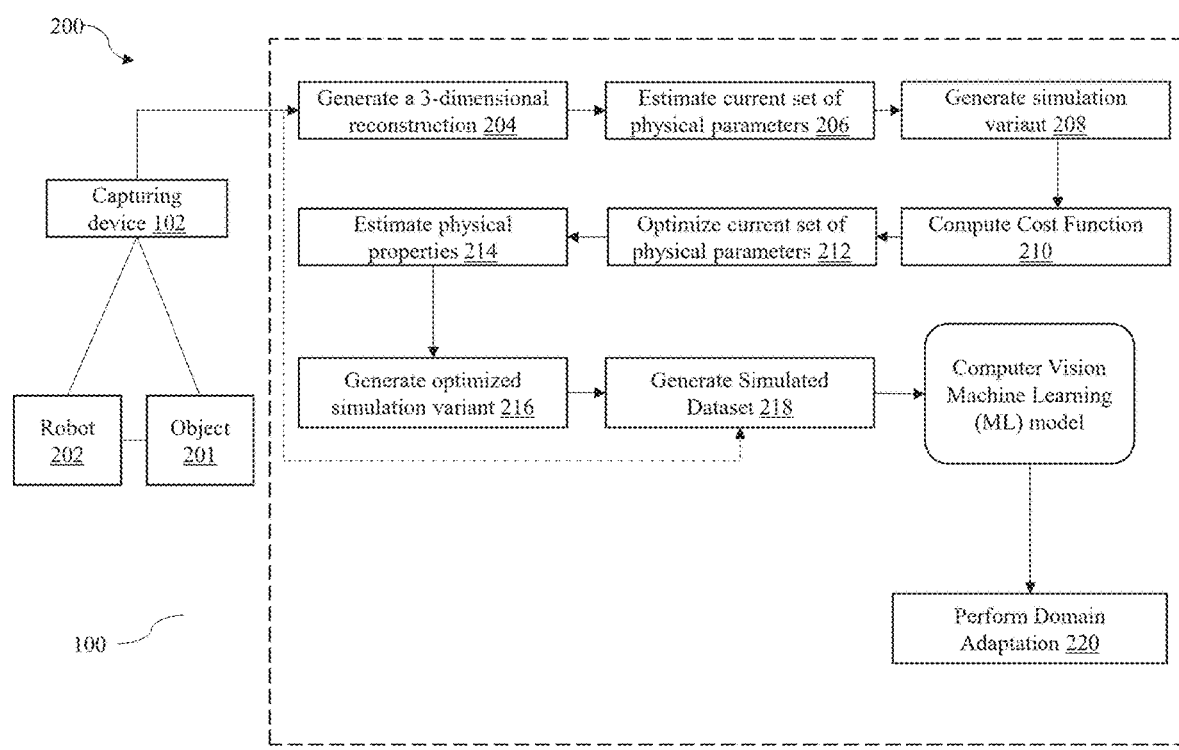
FIG. 2 illustrates an exemplary process flow for estimating the physical properties associated with the object, according to an embodiment of the present disclosure.

FIG. 2 illustrates an exemplary process flow 200 for estimating the physical properties associated with the object, according to an embodiment of the present disclosure. Referring to FIGS. 1 and 2 collectively, the imaging device 102 may capture an input media of the real-world environment 101 comprising of the object 201 (hereinafter referred to as 'target product') and a robot 202. Further, the imaging device sends the input media to the system 100. Furthermore, the object 201 may be a flexible object or a non-flexible object. Furthermore, the input media corresponds to an empty working space recorded by the imaging device 102, comprising of an image or a video, associated with the real-world environment 101.

In a non-limiting example, the imaging device 102 may be a camera or a 3D sensor. In the example, the imaging device 102 may be coupled with a digital light processing projector, enabling precise and fast depth perception by projecting structured light onto the object 201. Consequently, the imaging device 102 may be configured to capture data to generate accurate point clouds, even for small objects.

In an embodiment, the imaging device 102 may be mounted on the robot or placed in the bird's view of a scene corresponding to the real-world environment 101. Further, the imaging device 102 may be configured to capture the input media i.e., multiple views of the empty working space of the robot 202.

In an example, the robot 202 may be configured to manipulate the object 201 in the real-world environment 101. In the example, the control and coordination of the movements of the robot 202 may be managed and executed using a software framework. Consequently, the robot 202 may be configured with a planned trajectory from one position to another, considering factors such as obstacle avoidance and joint constraints for executing the manipulation of the object 201. Therefore, the software framework ensures efficient and accurate movement in robot's 202 operations in the real-world environment 101. Thus, in the example, the imaging device 102 captures or records the input media corresponding to the empty working space of the robot 202 i.e., without the object 201. Additionally, the imaging device 102 captures or records a real-world visual content indicating a recorded media while the object 201 is manipulated in the real-world environment 101 by the robot 202. Thus, the input media may also correspond to the real-world visual content including both the empty working space and the working space with object 201.

In an embodiment, the system 100 may be configured to receive the input media associated with the object 201. The input media may be captured by the imaging device 102 and sent to the at least one processor 108. In an embodiment, the input media may be captured by the imaging device 102 in real-time. The system 100 may process the received input media through at least one processor 108 to generate an output indicative of the result of estimating the physical properties associated with the object 201, as will be described in detail further below. The output may be displayed on the output device 104.

The at least one processor 108 may be configured to generate a three-dimensional (3D) reconstruction of the real-world environment 101 based on the input media from the imaging device 102, as shown by block 204. In an example, the 3D reconstruction of the real-world environment 101 corresponds to reconstructing the empty working space (in the real-world environment 101) of the robot 202 i.e., without the object 201. In an example, the 3D reconstruction refers to the process of creating a three-dimensional model or representation of the scene from a set of 2D images or other data sources sent by the imaging device 102. Further, in the example, the at least one processor 108 may be configured to generate the 3D reconstruction using Neural Radiance Fields (NERF) indicative of a type of neural network architecture used for 3D reconstruction. Furthermore, in the example, the at least one processor 108 via NERF may be configured to create a 3D model of the real-world environment 101 or the empty working space where the robot 202 operates. Consequently, the 3D reconstruction provides a detailed and accurate representation of the robot's 202 working environment in three dimensions. In the example, the 3D reconstruction may then be used for various purposes, such as path planning, object detection, or generating a simulation variant of the real-world environment 101.

Further, the at least one processor 108 may be configured to estimate a current set of physical parameters of the object 201, as shown by block 206. The at least one processor 108 may be configured with a physics-based prediction model receiving the input media comprising of the real-world visual content. The real-world visual content corresponds to the recorded media including a plurality of images illustrating the manipulation of the object 201 in the real-world environment 101 by the robot 202.

In an embodiment, the at least one processor 108 may be configured to provide a set of instructions to the robot 202. In an example, the set of instructions may correspond to manipulation of the object 201 by the robot 202. In the example, the set of instructions may include the robot 202 picking up the object 201, and the object 201 may be located at a specific point, for instance at point 'A'. The point 'A' may be the 'first point' among at least two points. The robot 202 may be expected to execute the action of grasping or lifting the object 201 from the point 'A'. Further, the set of instructions may include a manipulation action to be carried out by the robot 202 while holding the object 201. The manipulation action may correspond to any one or more of, compressing the object 201, stretching the object 201, or moving in a particular direction for instance left, right, upward, or downward. The robot 202 may execute one of these manipulation actions while maintaining control of the object 201. Furthermore, the set of instructions may include dropping the object 201 at a different location, for instance at a point 'B', may be the 'second point' among at least two points. Consequently, the at least one processor 108 may be configured to instruct the robot 202 to release or place the object 201 at the point 'B'.

In an embodiment, the physics-based prediction model incorporates principles from physics to simulate the behaviour and evolution of the scene i.e., the plurality of images illustrating the manipulation of the object 201 in the real-world environment 101 by the robot 202, as discussed in above paragraphs. The physics-based prediction model may be configured to encode the plurality of images (the real-world visual content) into a representation of physical states such that the underlying physical characteristics or states of the real-world visual content may be captured. Thus, the encoding aims to extract relevant information from the plurality of images (the real-world visual content) that may be used to simulate the physics of the scene i.e., the recorded media while the object 201 is manipulated in the real-world environment 101 by the robot 202.

Further, the physics-based prediction model may be used to simulate how the scene i.e., the plurality of images illustrating the manipulation of the object 201 in the real-world environment 101 by the robot 202 evolves over time based on latent parameters. The latent parameters may be hidden variables that capture essential information about the scene and maybe learned during the training process of the physics-based prediction model. In an example, the physics-based prediction model is a self-supervised learning model capable of generating training labels using the real-world visual content without relying on external annotations. In the example, the physics-based prediction model may be configured to capture temporal dependencies in the real-world visual content. Thus, the physics-based prediction model may be trained for forward prediction, i.e., to predict future frames of the scene given the current state. The training of the physics-based prediction model may be based on actions (manipulations) performed by the robot 202 within the scene.

Thus, the physics-based prediction model may transform each of the plurality of images into a corresponding simulated physical state associated with the object 201 using an image encoder. Further, the physics-based prediction model may determine an evolution of the simulated physical state of the object 201 based on the predicted future frames. Consequently, the physics-based prediction model estimates the current set of physical parameters based on the evolution of the simulated physical state corresponding to each of the plurality of images. In an example, the simulated physical state corresponds to the evolution of the scene over time, based on the learned latent parameters and the manipulations performed by the robot 202.

In an example, the current set of physical parameters may be alternatively referred to as the first set of physical parameters inferred by the physics-based prediction model using the real-world visual content. Thus, the current set of physical parameters indicates a collection of characteristics or properties that describe the current state of the object 201 in the real-world environment 101. In the example, the current set of physical parameters may be associated with the physical aspects of the object 201 in the real-world environment 101 at a particular moment in time. The current set of physical parameters may include information such as position, orientation, velocity, shape, and other relevant attributes that define the object's 201 behaviour and appearance.

Further, the at least one processor 108 may be configured to generate a simulation variant corresponding to the manipulation of the object based on the 3D reconstruction and the current set of physical parameters, as shown by block 208. In an example, the simulation variant may refer to a simulated version of the object's 201 behaviour or appearance while being manipulated. The at least one processor 108 may be configured to generate the simulation variant based on the 3D reconstruction of the real-world environment 101 and the estimated current set of physical parameters. Thus, the simulation variant may be a computer-generated representation of how the object 201 is expected to behave or look in the given real-world scenario. Further, the simulation variant may be specifically tailored to correspond to the manipulation of the object based on the estimated current set of physical parameters such that the simulation takes into account the changes in the object's state while being manipulated in the real-world environment 101. Therefore, the simulation variant may be expected to mirror or represent the expected behaviour of the object 201 during the manipulation.

In an example, the at least one processor 108 may be configured with PyBullet simulation engine for generating the simulation variant. In the example, PyBullet simulates rigid body dynamics, robotic systems, and physical interactions in a virtual environment. PyBullet provides a platform for simulating the dynamics of the object 201, including the robot 202 and any manipulations thereof, in a realistic and physics-based manner. Thus, the simulation variant generated using PyBullet serves as a virtual testbed for the robot's 202 actions. In an advantageous aspect, the simulation variant generated using PyBullet may allow for the evaluation and refinement of the robot's 202 behaviour and responses in different scenarios without the need for physical implementation. Thus, providing advantages in tasks like object manipulation, where precise control and understanding of physical interactions may be crucial.

Further, the at least one processor 108 may be configured to compute a cost function based on comparing the simulation variant and the real-world visual content, as shown by block 210. In an example, the cost function may indicate dissimilarity between the simulation variant and the real-world visual content. In an example, the cost function may be a mathematical computation or measure that quantifies the dissimilarity or error between the simulation variant (simulated representation) and the real-world visual content such that the at least one processor 108 may be able to determine how closely the simulation variant matches an observation of the real-world environment 101. Thus, the cost function may indicate the degree of dissimilarity or mismatch between the simulation variant and the real-world visual content. In the example, a higher cost function may suggest a greater divergence between the simulated and real-world observations, while a lower cost function may indicate a closer match.

Further, the at least one processor 108 may be configured to optimize the current or the first set of physical parameters, as shown by block 212. In an example, the optimization may correspond to adjusting or refining the first set of physical parameters (inferred by the physics-based prediction model) to minimize the cost function. The at least one processor 108 may be configured to perform optimization to find a set of physical parameters that results in the simulation variant that closely aligns with the real-world visual content. Therefore, the objective of the optimization is to increase the similarity between the simulation variant and the real-world visual content by minimizing the dissimilarity (as indicated by the cost function), the simulation becomes more accurate and closer to the actual observations.

Further, the at least one processor 108 may be configured to estimate the physical properties associated with the object based on optimizing the current set of physical parameters with the cost function such that a similarity between the simulation variant and the real-world visual content increases, as shown by block 214. The optimization process in the previous step along with the cost function, refines the current or the first set of physical parameters to improve the accuracy of the simulated variant and, consequently, enhances the estimation of the physical properties associated with the object 201. The optimization process bridges the gap between the physics-based prediction and the real-world visual observations, allowing for a more accurate representation of the object's behaviour and properties. In a non-limiting example, the physical properties may include both dynamic and static properties of the object 201, particularly for the flexible object. The physical properties may include not only the dynamic parameters but also static attributes like the object's shape, colour, material properties, or any other intrinsic features that may contribute to the object's 201 appearance and behaviour.

Further, the at least one processor 108 may be configured to generate an optimized simulation variant, as shown by block 216. In an example, the optimized simulation variant corresponds to the simulation variant that more accurately reflects the estimated physical properties of the object 201. As mentioned in the block 212, by refining the current set of physical parameters through optimization, the optimized simulation variant becomes more aligned with the expected behaviour and appearance of the object 201 based on the estimated physical properties or the physical characteristics.

Further, the at least one processor 108 may be configured to generate a simulated dataset in response to estimating the one or more physical properties associated with the object 201 and the optimized simulation variant, using the 3D reconstruction, as shown by block 218. In an example, the simulated dataset indicates a dataset of simulated instances associated with the manipulation of the object 201. In the example, the simulated dataset may include instances that represent various scenarios of manipulating the object 201, incorporating the optimized simulation variant(s) and the estimated physical properties of the object 201. Thus, each of the simulated instances in the simulated dataset may be a virtual representation of the object's 201 behaviour or appearance under different conditions, reflecting the variations in the manipulation of the object 201 based on the estimated physical properties and the optimized simulation variant. In an advantageous aspect, the generation of the simulated dataset may allow for the creation of a diverse set of training examples that might be challenging or costly to obtain in the real world. This synthetic data (the simulated dataset) may be valuable for training machine learning models, especially when real-world data is limited or difficult to acquire.

Further, the generated simulated dataset may then be used as training data for a computer vision (CV) machine learning (ML) model. In an example, the CV ML model may be configured to learn and recognize patterns, features, or relationships within the simulated data. Thus, the CV ML model may be trained using the simulated instances in the simulated dataset, allowing the CV ML model to learn and generalize from the simulated scenarios and consequently trained to interpret the input media i.e., learns to understand and interpret the visual representations of the object's 201 behaviour or appearance in the simulated dataset.

Further, the at least one processor 108 may be configured to perform domain adaptation, as shown by block 220. In an example, the domain adaptation process is specifically performed using a few-shot learning approach. In the example, the few-shot learning involves refining the CV ML model with a very small number of examples from the target domain. For instance, a set of data points associated with the real-world environment 101 may be used for performing domain adaptation.

In an embodiment, performing the domain adaptation incorporates the set of data points from the real-world environment 101, the optimized simulation variant, and the computer vision ML model trained on the optimized simulation variant. Thus, the combination of the real-world data, simulated instances, and the CV ML model itself enhances the model's ability to adapt to the intricacies of the real-world domain. An advantageous aspect of the domain adaptation is to make the trained computer vision ML model adaptable to the real-world environment 101. Thus, by leveraging the few-shot learning and incorporating real-world data in the adaptation process, the computer vision ML model may be better equipped to handle the nuances and variations present in real-world scenarios.

In an embodiment, following the domain adaptation process based on the few-shot learning, the trained computer vision ML model may be prepared for deployment. The refinement through few-shot learning ensures that the computer vision ML model may be capable of adapting to the real-world environment, even with limited real-world data. Thus, in an advantageous aspect, the adaptability gained by the computer vision ML model via domain adaptation may be crucial for successful deployment, implying that the computer vision ML model has learned to generalize well from the simulated environment to the real-world context, making it a valuable tool for analyzing real-world visual content associated with the manipulation of the object 201.

In an alternative embodiment, the domain adaptation techniques may be applied not only to the transition from simulated data to real-world data but also to other industrial problems for instance, in rotating machine fault analysis, where the source domain may include data from various types of machines or operating conditions, and the target domain is specific to a particular machine or set of operating conditions. The domain adaptation may also involve adapting from rotating machine simulation data to real-world data for a particular/specific rotating machine.

Further, it is appreciated that the above-mentioned details may be repeated for multiple industrial applications and the objects for which are the physical properties are to be estimated.

Figure 3:
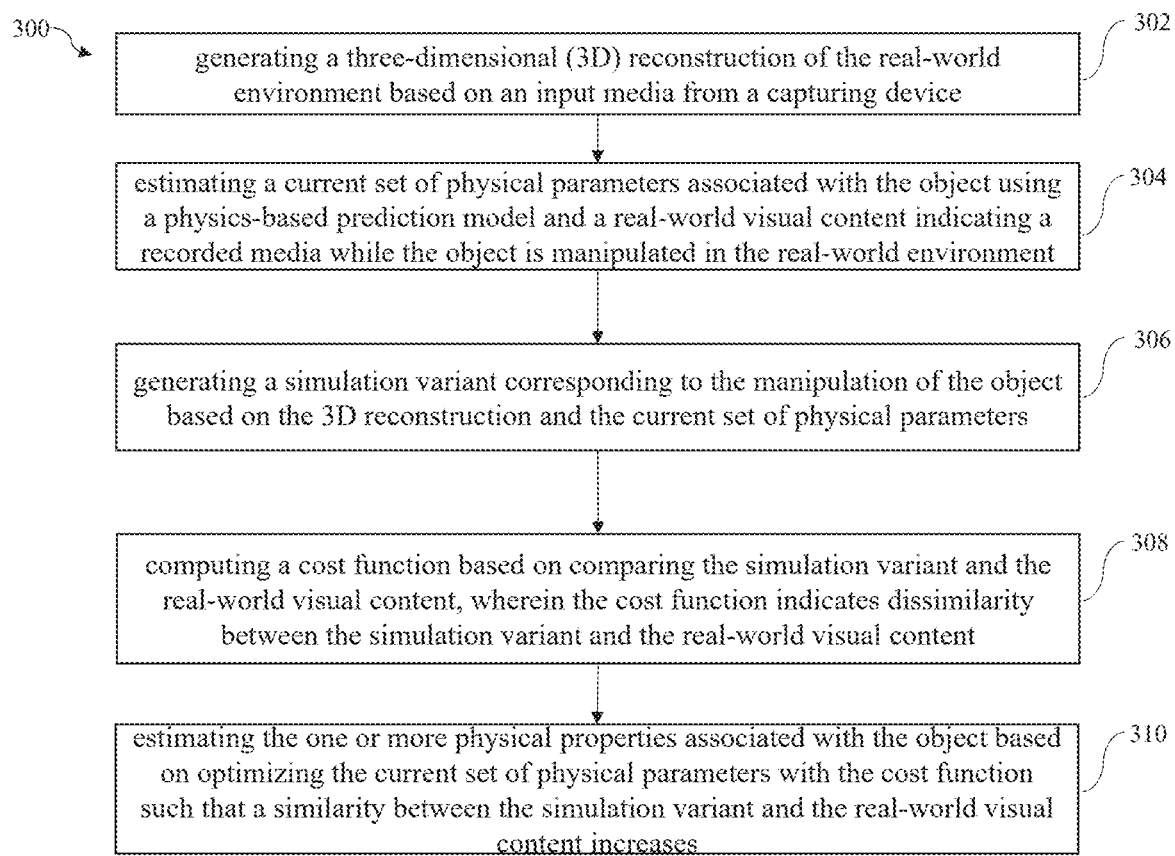
FIG. 3 illustrates a flowchart depicting a method for estimating the physical properties associated with the object, according to another embodiment of the present disclosure.

FIG. 3 illustrates a flowchart depicting a method 300 for estimating the physical properties associated with the object 202, according to another embodiment of the present disclosure. The method 300 may be performed by the system 100, in particular, the processor 108 of the system 100.

The method 300 may include receiving the input media from the imaging device 102.

Figure 4:
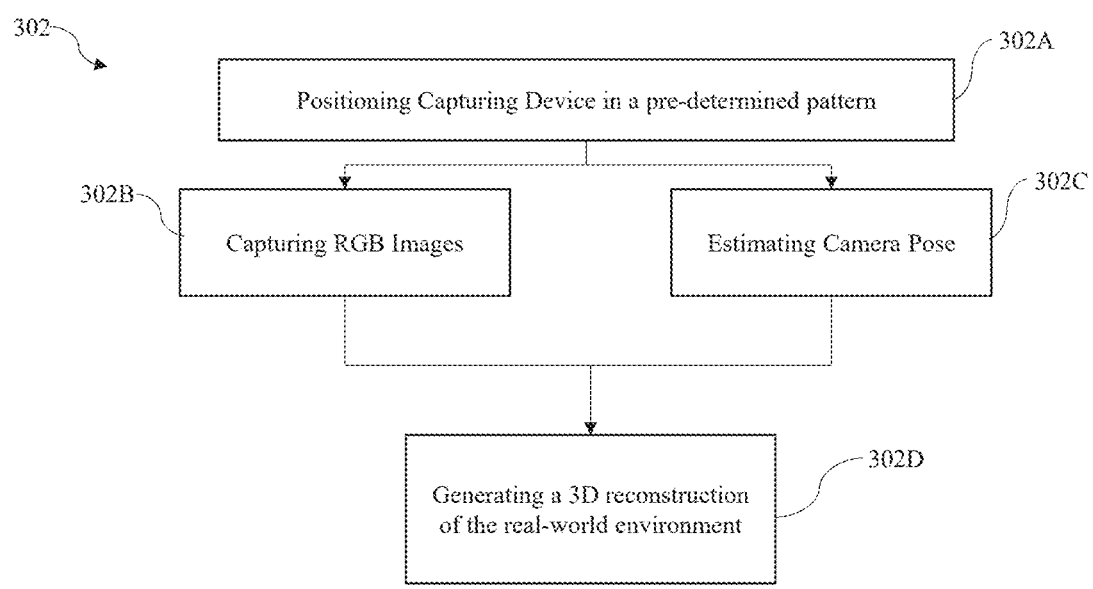
FIG. 4 illustrates a process flow of the method step for creating a 3D reconstruction of a real-world environment, according to another embodiment of the present disclosure.

At step 302, the method 300 may include generating the 3D reconstruction of the real-world environment 101 using the input media from the imaging device 102. Further, FIG. 4 illustrates a process flow comprising sub-steps 302A-302D of the method step 302, for creating the 3D reconstruction of the real-world environment 101, according to another embodiment of the present disclosure. Thus, the generation of the 3D reconstruction may be explained in conjunction with FIG. 4 in the forthcoming paragraphs.

At sub-step 302A, the method step 302 may include positioning the imaging device 102 in a predetermined pattern. In an example, the imaging device 102 may be strategically positioned in the pre-determined pattern to capture the scene (empty working space) from multiple angles. In an example, the predetermined pattern of the imaging device 102 may aid in covering the entire scene, including potential blind spots. This is crucial for achieving a comprehensive 3D reconstruction, as capturing the scene from various viewpoints may assist in creating a more detailed and accurate representation.

At sub-step 302B, the method step 302 may include the imaging device 102 capturing red, green, and blue (RGB) images (2D images) of the scene. Thus, capturing the RGB images may eliminate the need to estimate a camera pose separately, as the pre-determined pattern may ensure comprehensive coverage.

At sub-step 302C, the method step 302 may include estimating the camera pose. In an example, the camera pose of the captured RGB image may be determined by providing the camera pose directly or by using an algorithm like COLMAP for camera pose estimation. In the example, COLMAP may correspond to a Structure from Motion (SfM) algorithm that utilizes 2D image features to compute a 3D camera pose.

At sub-step 302D, the method step 302 may include generating the 3D reconstruction using NERF, based on the RGB images and the estimated camera poses.

Figure 5:
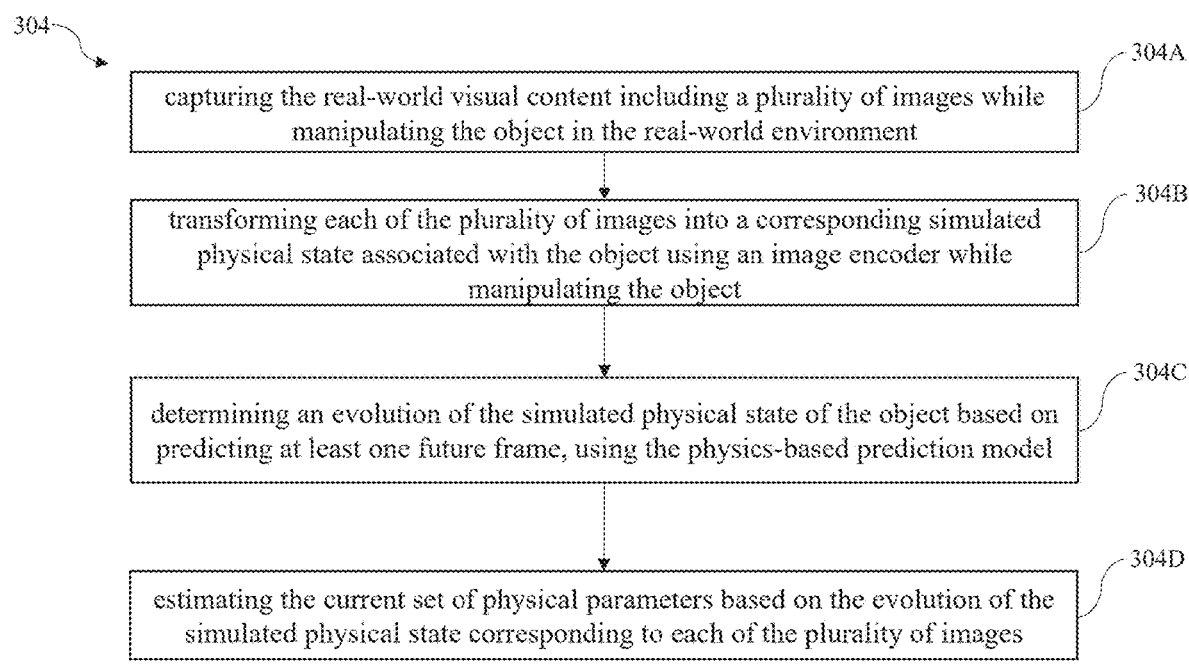
FIG. 5 illustrates a process flow of the method step for estimating a current set of physical parameters, according to another embodiment of the present disclosure.

Now, referring back to FIG. 3, at step 304, the method 300 may include estimating the current set of physical parameters associated with the object 201 using the physics-based prediction model and the real-world visual content indicating the recorded media while the object 201 is manipulated in the real-world environment 101. Further, FIG. 5 illustrates a process flow comprising sub-steps 304A-304D of the method step 304, for estimating the current set of physical parameters, according to another embodiment of the present disclosure. Thus, the estimation of the current set of physical parameters may be explained in conjunction with FIG. 5 in the forthcoming paragraphs.

At sub-step 304A, the method step 304 may include capturing the real-world visual content. In an example, the real-world visual content includes the plurality of images illustrating the manipulation of the object 201 in the real-world environment 101. The plurality of images may serve as input data for subsequent analysis.

At sub-step 304B, the method step 304 may include transforming the plurality of images (the real-world visual content) into the simulated physical state. In an example, the plurality of images may be processed in this step. Further, in the example, each of the plurality of images may be transformed into the corresponding simulated physical state associated with the object 201. In the example, the transformation may be achieved using the image encoder such that the simulated representation of the object's 201 state based on the real-world visual content may be created.

At sub-step 304C, the method step 304 may include determining the evolution of the simulated physical state of the object 201. In an example, the physics-based prediction model may predict the future frame for determining the evolution of the simulated physical state of the object 201. In the example, the physics-based model takes into account the current simulated state and predicts the evolution of the current simulated state over time, potentially capturing the dynamics or changes in the object's behaviour.

At sub-step 304D, the method step 304 may include estimating the current set of physical parameters based on the evolution of the simulated physical state corresponding to each of the plurality of images. In an example, an analysis of the simulated state changes over time, the system 100 may infer or estimate the current set of physical parameters that describe the object's 201 current state in the real-world environment 101. Thus, the estimation of the current set of physical parameters provides an inferred understanding of the object's 201 current physical characteristics.

Now, referring back to FIG. 3, at step 306, the method 300 may include generating the simulation variant corresponding to the manipulation of the object 201, based on the 3D reconstruction and the current set of physical parameters.

In an embodiment, the method 300 may include generating the simulated representation (the simulation variant) that corresponds to the manipulation of the object 201 in the virtual environment. The simulation leading to simulated representation may allow for the modelling of the object 201 behaviour or appearance during the manipulation. In an example, the generation of the simulation variant may be based on two key components: a) The 3D reconstruction of the real-world environment 101. The 3D reconstruction may include the spatial layout and geometry of the scene, thus providing the virtual representation of the physical environment. b) The current set of physical parameters, inferred by the physics-based prediction model, thus, providing the dynamic aspects of the object's 201 behaviour during the manipulation. Further, in the example, the simulation variant may be generated using PyBullet. The simulation variant serves as the virtual testbed for the manipulation of the object 201. In an advantageous aspect, the simulation variant allows for the evaluation of the object 201 response to different actions or manipulations, considering the current set of physical parameters and the reconstructed 3D environment (3D reconstruction).

At step 308, the method 300 may include computing the cost function based on comparing the simulation variant and the real-world visual content. In an example, the cost function may indicate dissimilarity between the simulation variant and the real-world visual content.

Figure 6:
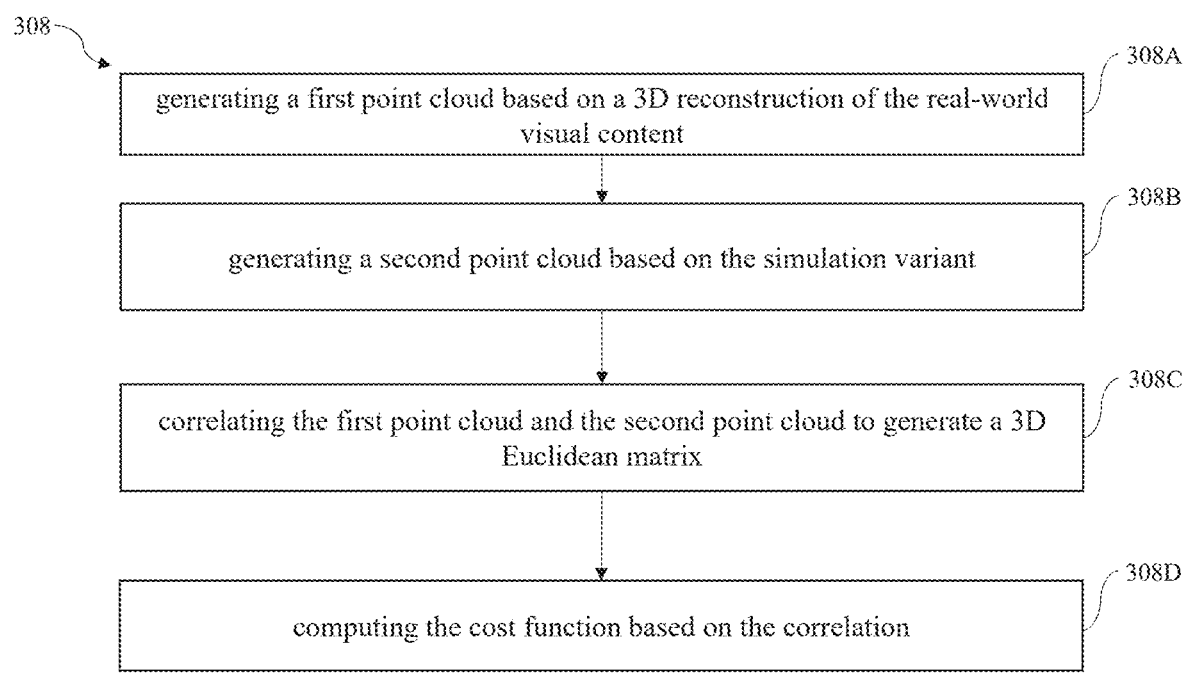
FIG. 6 illustrates a process flow of the method step for computing a cost function, according to another embodiment of the present disclosure.

Further, FIG. 6 illustrates a process flow comprising sub-steps 308A-308D of the method step 308, computing the cost function, according to another embodiment of the present disclosure. Thus, computing the cost function may be explained in conjunction with FIG. 6 in the forthcoming paragraphs.

At sub-step 308A, the method step 308 may include generating a first point cloud. In an example, a point cloud may correspond to a collection of points in a three-dimensional space that represents the geometry of the object 201 or the real-world environment 101. In the example, the method step 304 may include generating the first point cloud based on the 3D reconstruction of the real-world visual content. Thus, the first point cloud represents the spatial arrangement of the object 201, surfaces in the real-world environment 101.

At sub-step 308B, the method step 308 may include generating a second point cloud based on the simulation variant. In an example, the second point cloud may represent the simulated version of the real-world environment 101, including the manipulated object 201 and its interactions.

At sub-step 308C, the method step 308 may include correlating the first and the second point clouds. In an example, the correlation indicates correspondences or associations between the points in the real-world point cloud and the simulated point cloud. Further, the correlation may generate a 3D Euclidean matrix, indicating the spatial relationships and distances between points in the real-world point cloud and the simulated point cloud.

At sub-step 308D, the method step 308 may include computing the cost Function. In an example, the cost function may be computed based on the correlation results. The cost function quantifies the dissimilarity or error between the first (real-world) and second (simulated) point clouds. In the example, the computation of the cost function includes assessing the alignment of the points in the simulated point cloud with their corresponding points in the real-world point cloud. Consequently, the cost function relates to the measurement of the simulation variant alignment with the real-world visual content. In one example, minimizing the cost function would imply that the simulation variant is more accurate and representative of the real-world scenario.

Now, referring back to FIG. 3, at step 310, the method 300 may include estimating the physical properties of the object 201 based on optimizing the current set of physical parameters with the cost function such that the similarity between the simulation variant and the real-world visual content increases. In an example, the physical properties may include characteristics such as the shape, size, or material properties of the object 201. Thus, the estimation of the physical properties may assist the simulation variant in understanding and representing the object's 201 attributes. Further, in the example, the optimization may correspond to adjusting the current set of physical parameters. The current set of physical parameters, which describe the dynamic behaviour of the object 201, and are initially estimated via the physics-based prediction model and other steps in the process as explained above, may be optimized or refined to improve their accuracy.

Further, the optimization may use the cost function to increase the similarity between the simulation variant and the real-world visual content such that adjustments are made to the current set of physical parameters for the purpose of minimizing the differences between the simulated scenario (simulation variant) and the actual observed scenario (the real-world visual content). The optimization process may involve an iterative loop such that the optimization may be performed multiple times. In an example, with each iteration, the current set of physical parameters may be adjusted, and the cost function is recalculated to converge towards the current set of physical parameters that result in the simulation variant that closely matches the real-world visual content. In another example, the optimization may be understood as employing a trial-and-error approach involving the iterative loop. The iterative loop may include testing a particular set of physical parameters by generating the simulated scenario and the computing associated cost. Thereafter, adjustments may be made to the particular set of physical parameters based on the computed cost, and this iterative loop may continue until the minimum cost is achieved. Thus, the iterative loop aims to refine the set of parameters to achieve the simulation variant that closely aligns or resembles with the real-world visual content.

Consequently, by optimizing the current set of physical parameters to enhance the similarity, the simulation variant more accurately reflects the real-world behaviour of the object 201. In an advantageous aspect, the optimized simulation variant may be valuable for tasks such as robotics, where the virtual representation (simulation variant) that closely aligns with real-world observations allows for more reliable predictions and assessments.

Figure 7:
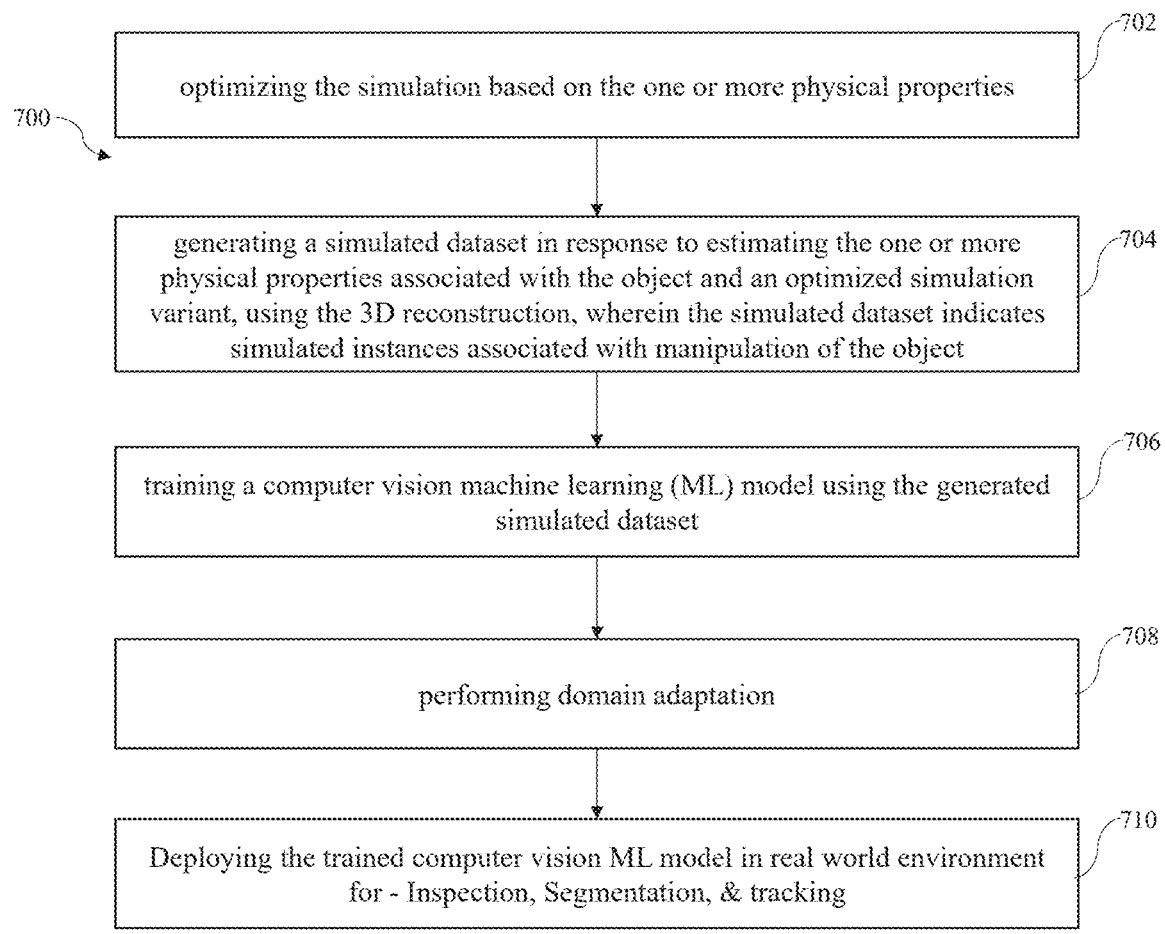
FIG. 7 illustrates a flowchart depicting a method for training and deploying a computer vision machine learning (ML) model in the real-world environment, according to another embodiment of the present disclosure.

FIG. 7 illustrates a flowchart depicting a method 700 for training and deploying the computer vision ML model in the real-world environment 101, according to another embodiment of the present disclosure.

At step 702, the method 700 may include optimizing the simulation variant using the physical properties of the object 201. Thus, the simulation parameters corresponding to the simulation variant may be adjusted based on the physical properties such that the accuracy of the simulation variant may improve, thus, making the simulation variant more representative of the real-world behavior of the object 201.

At step 704, the method 700 may include generating the simulated dataset in response to estimating the physical properties and optimizing the simulation variant. The simulated dataset includes simulated instances associated with the manipulation of the object 201. Each instance may represent a scenario in which the object is manipulated in the virtual environment. Further, the 3D reconstruction may provide additional information about the spatial layout and geometry of the real-world environment 101.

Figure 8:
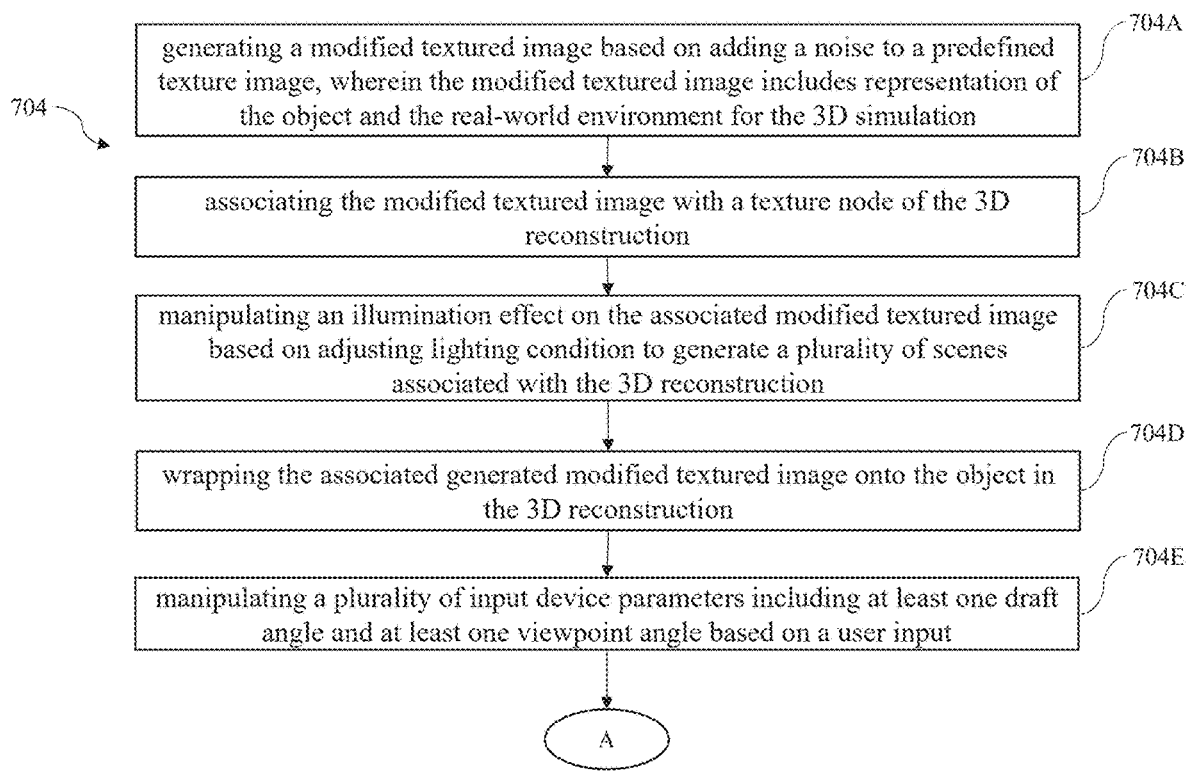
FIG. 8 illustrates a flowchart depicting a method for generating a simulated dataset for training the computer vision ML model, according to another embodiment of the present disclosure.
Figure 8:
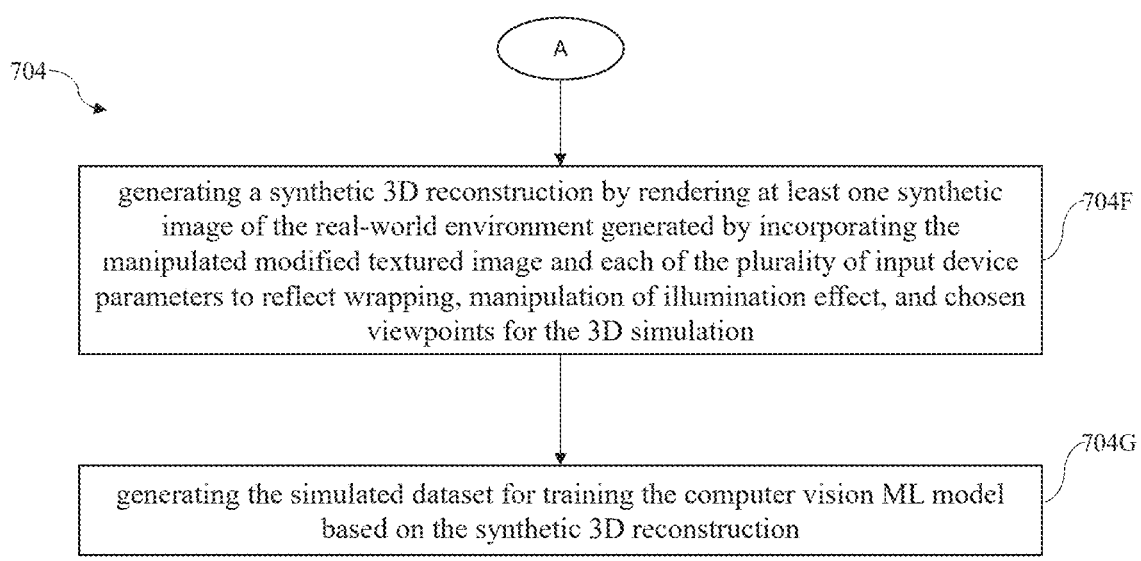

Further, FIG. 8 illustrates a process flow comprising sub-steps 704A-704G of the method step 704, for generating the simulated dataset for training the computer vision ML model, according to another embodiment of the present disclosure. Thus, the generation of the simulated dataset may be explained in conjunction with FIG. 8 in the forthcoming paragraphs.

At sub-step 704A, the method step 704 may include generating a modified textured image based on adding noise to a predefined texture image. The modified textured image may include a representation of the object 201 and the real-world environment 101 for the 3D simulation.

At sub-step 704B, the method step 704 may include associating the modified textured image with a texture node in the 3D reconstruction, thus linking the modified textured image to the spatial layout of the real-world environment 101.

At sub-step 704C, the method step 704 may include manipulating an illumination effect on the modified textured image by adjusting the lighting conditions. In an example, the manipulation may result in the generation of a plurality of scenes associated with the 3D reconstruction, reflecting different lighting scenarios.

At sub-step 704D, the method step 704 may include wrapping the modified textured image onto the object 201 within the 3D reconstruction. In an example, the wrapping includes integrating the representation of the object 201 and the real-world environment 101 onto the virtual object in the simulated 3D environment (simulation variant).

At sub-step 704E, the method step 704 may include manipulating a set of input device (imaging device) parameters based on a user input. In an example, the set of input device (imaging device) parameters may include adjusting at least one draft angle and at least one viewpoint angle. The set of input device (imaging device) parameters may influence the generation and viewing of the simulated scenes in the 3D simulation.

At sub-step 704F, the method step 704 may include generating a synthetic 3D reconstruction by rendering a synthetic image of the real-world environment 101. The synthetic 3D reconstruction includes the wrapping of the modified textured image onto the object 201, the manipulation of illumination effects, and selected viewpoints for the 3D simulation.

At sub-step 704G, the method step 704 may include generating the simulated dataset for training the computer vision ML model created based on the synthetic 3D reconstruction. The simulated dataset may include a set of images that portray diverse scenarios, encompassing different lighting conditions and viewpoints. Thus, in an advantageous aspect, the simulated dataset provides a diverse and representative, valuable dataset for the training of the computer vision ML model. Further, the variations in lighting conditions, object appearance, and viewpoint angles captured in the simulated dataset help the computer vision ML model generalize different scenarios when deployed in the real-world environment 101.

Now, referring back to FIG. 7, at step 706, the method 700 may include training the computer vision machine learning (ML) model using the generated simulated dataset. In an example, the computer vision model may be trained to interpret and understand visual information, learning patterns and relationships from the simulated instances. In the example, the training may include exposing the computer vision ML model to various simulated scenarios, allowing the computer vision ML model to learn the analyzing and interpretation of the real-world visual content associated with the manipulation of the object 201.

At step 708, the method 700 may include performing domain adaptation (DA). In an example, domain adaptation may be applied to the trained computer vision machine learning (ML) model for adjusting the computer vision ML model to perform effectively in the real-world environment 101. In an example, the domain adaptation may include using a few-shot learning approach. In the example, the few-shot learning involves training the computer vision ML model with minimal number of examples from the target domain. For instance, a set of data points associated with the real-world environment 101 may be used for performing domain adaptation. In an advantageous aspect, the domain adaptation may often be necessary because the computer vision ML model is initially trained on the simulated dataset, and the learning between the simulated and real-world domains may differ. Therefore, the domain adaptation ensures that the computer vision ML model may be efficiently generalized to provide accurate predictions upon deployment in the real-world setting across multiple applications.

Figure 9:
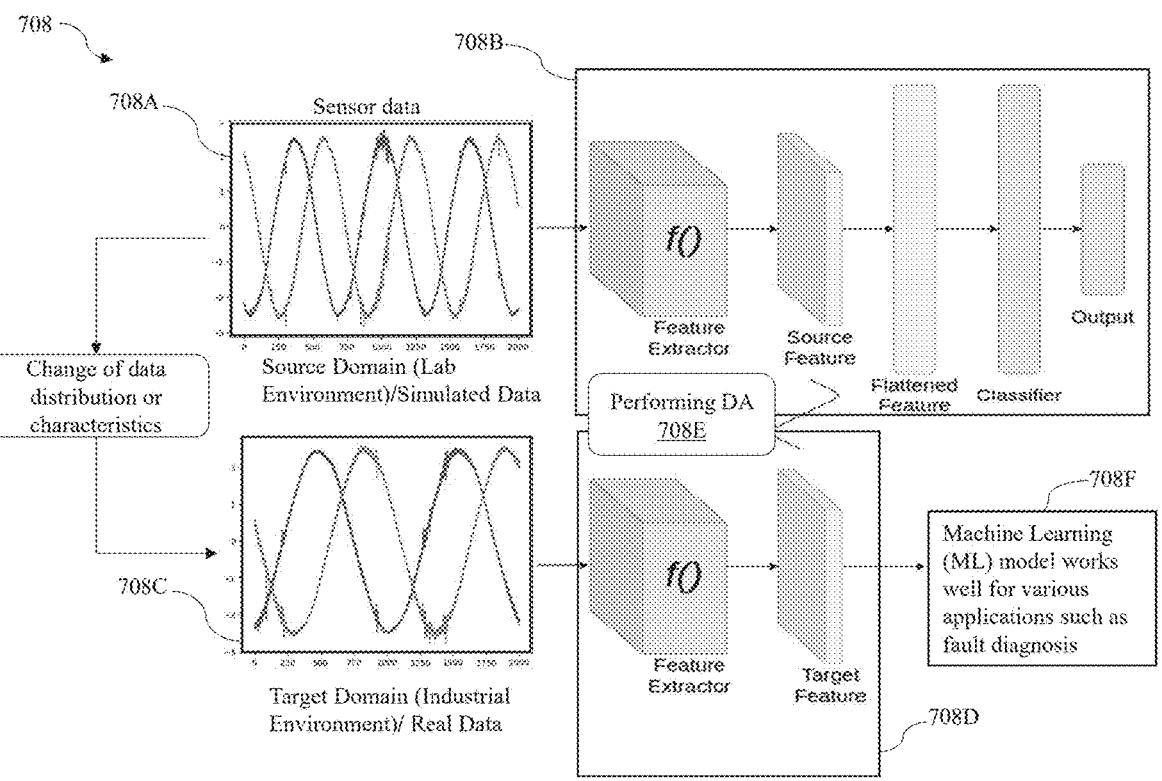
FIG. 9 illustrates a schematic process flow comprising method step for performing domain adaptation, according to another embodiment of the present disclosure.

Further, FIG. 9 illustrates a schematic process flow comprising sub-steps 708A-708F of the method step 708, for performing domain adaptation, according to another embodiment of the present disclosure. Thus, the domain adaptation may be explained in conjunction with FIG. 9 in the forthcoming paragraphs.

In an example, the development of a ML model for instance, intelligent fault diagnosis in rotating machinery via utilizing sensor data, may be a significant advancement with implications for industrial applications. The operational state of the rotating machines, characterized by parameters like rotational speed and load torque, directly influences the distribution of sensor data. In the example, the sensor data may correspond to the information collected by the sensors installed on the rotating machinery. The sensors may be adapted to monitor various parameters such as rotational speed, temperature, vibration, and load torque. The data collected by the sensors provides valuable insights into the operational state and performance of the rotating machinery. Furthermore, the sensor data may be used as an input for training the ML model for fault diagnosis.

Furthermore, to ensure the ML model's efficacy in real-world industrial settings, domain adaptation techniques may be employed including transferring knowledge gained from the ML model trained on the sensor data collected under controlled laboratory environment (i.e., a source domain) to effectively handle sensor data from diverse a real-world industrial environment (i.e., a target domain).

Thus, domain adaptation may serve as a critical mechanism to mitigate the domain shift between the source and target domains, facilitating the seamless transfer of knowledge and adaptation of the ML model to the unique characteristics of the target domain. Aligning the distributions of the sensor data across various domains, the ML model may effectively generalize learned patterns and make accurate predictions in the real-world environments (industrial), thus enhancing ML model's robustness and practical utility.

At sub-step 708A, the method step 708 may include receiving the sensor data i.e., from the source domain.

Further, at sub-step 708B, the method step 708 may include the machine learning model, for instance a 1D convolutional neural network (CNN) model, for a multi-classification task related to diagnosing faults in the rotating machinery. In an example, the 1D CNN model may be used to analyze the sensor data collected over time. Each sensor reading (data) at a particular time step may be treated as a feature, forming a one-dimensional sequence. The 1D CNN model may then learn to extract relevant features from this sequential data to classify the rotating machineries operational state or detect faults.

At sub-step 708C, the method step 708 may include receiving few-shot data from the real-world industrial environment i.e., the target domain such that the characteristics of the target domain may differ from the source domain.

At sub-step 708D, the method step 708 may include training the ML model (1D CNN) with the few-shot data from the real-world industrial environment.

At step 708E, the method step 708 may include performing domain adaptation (DA). In an example, the domain adaptation may be a Supervised Contrastive Few-Shot Learning for High-Frequency Time Series (SCFSL), consisting of a supervised contrastive framework. In an advantageous aspect, the supervised contrastive framework may be well-suited for few-shot learning tasks and allows for multiple augmentations of the sensor data.

Additionally, in an exemplary experimental demonstration, upon comparing the performance of the SCFSL technique with two baseline technique, for instance Cross-domain baseline and Finetuning baseline, may provide notable advantages, as provided in Table (1) below. In an example, in Cross-domain baseline technique, the ML model may be trained solely on data from a specific source operating condition. It is then directly evaluated on data from the target operating condition without any additional training on few-shot target data. In an example, in Finetuning baseline technique, the ML model may be trained on data from the source operating condition. Subsequently, the ML model may be finetuned using few-shot target data before being evaluated on the target operating condition. In an example, in SCFSL technique, the ML model may be trained on data from the source operating condition and then adapted to the target operating condition using the SCFSL method, which involves utilizing few-shot target data. Finally, the adapted ML model may be evaluated on the target operating condition to assess its performance.

TABLE 1

Performance Comparison of SCFSL with Cross-domain baseline and Finetuning baseline

| | | F1-score (Macro avg) | | |
|---|---|---|---|---|
| Scenario | Preprocessing | Cross-domain baseline | SCFSL | Finetuning baseline |
| 0to1 | FFT | 50.7 | 76.0 | 75.2 |
| 0to2 | FFT | 46.0 | 95.6 | 82.5 |
| 1to0 | FFT | 63.5 | 90.3 | 77.8 |
| 1to2 | FFT | 64.9 | 97.0 | 73.0 |
| 2to0 | FFT | 41.8 | 94.5 | 83.5 |
| 2to1 | FFT | 37.5 | 72.9 | 70.5 |
| Average | | 50.7 | 87.7 | 77.1 |

Referring to Table (1) above, the column 'Scenario' with values 0 to 1 may refer to '0' being the source operating condition and '1' being the target operating condition. In the example, there are three different operating conditions (domains) in the dataset for arriving at the exemplary experimental demonstration provided in Table (1) above. Each of the operating conditions may include a varied parameters, for instance in the rotating machinery, the rotational speed and/or the load torque may vary for each operating conditions, as illustrated in exemplary Table (2) below:

TABLE 2

Three different operating conditions

| Operating Condition | Rotational speed [rpm] | Load Torque [Nm] |
| --- | --- | --- |
| 0 | 3100 | 0 |
| 1 | 3100 | 2 |
| 2 | 3100 | 4 |

Now, referring back to Table (1), the column 'F1-score' may refer to a metric to evaluate the performance of the classification models (cross-domain, SCFSL, finetuning). The F1-score may combine precision and recall into a single measure, providing a balanced assessment of the ML model's ability to correctly classify instances across different classes. When comparing the F1-score results of the SCFSL technique with the cross-domain baseline and finetuning baseline, the F1-score provides an evaluation of the classification performance of the SCFSL technique compared to the two baseline technique, considering both the correctness and completeness of the ML model's predictions across all classes.

Thus, in an advantageous aspect, at step 708F, the method step 708 may include the SCFSL technique providing a novel approach to domain adaptation by leveraging few-shot learning techniques within the supervised contrastive framework, ultimately enhancing the ML model's performance when deployed in real-world industrial environments such as fault diagnosis.

Now referring back to FIG. 7, At step 710, the method 700 may include deploying the trained computer vision ML model in real-world environment 101. For instance, the trained computer vision ML model may be deployed for inspecting and analyzing visual content, identifying specific features or anomalies. For another instance, the trained computer vision ML model may be deployed for performing segmentation and distinguishing different objects or regions within the visual scene. For another instance, the trained computer vision ML model may be deployed for tracking the movement or changes of objects over time.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

We claim:

1. A method for estimating one or more physical properties associated with an object, the method comprising:
generating a three-dimensional (3D) reconstruction of a real-world environment based on an input media from a capturing device;
estimating a current set of physical parameters associated with the object using a physics-based prediction model and a real-world visual content indicating a recorded media while the object is manipulated in the real-world environment;
generating a simulation variant corresponding to the manipulation of the object based on the 3D reconstruction and the current set of physical parameters;
computing a cost function based on comparing the simulation variant and the real-world visual content, wherein the cost function indicates dissimilarity between the simulation variant and the real-world visual content; and
estimating the one or more physical properties associated with the object based on optimizing the current set of physical parameters with the cost function such that a similarity between the simulation variant and the real-world visual content increases.

2. The method as claimed in claim 1, wherein estimating the current set of physical parameters comprises:
capturing the real-world visual content including a plurality of images while manipulating the object in the real-world environment;
transforming each of the plurality of images into a corresponding simulated physical state associated with the object using an image encoder while manipulating the object;
determining an evolution of the simulated physical state of the object based on predicting at least one future frame, using the physics-based prediction model; and
estimating the current set of physical parameters based on the evolution of the simulated physical state corresponding to each of the plurality of images.

3. The method as claimed in claim 2, wherein manipulating the object comprises:
providing a set of instructions to a robot, wherein the set of instructions comprising:
picking the object from a first point among at least two points using the robot,
performing a manipulation action indicating at least one of compressing and stretching the object or move towards at least one of a left direction or a right direction or an upward direction or a downward direction, while holding the object; and
dropping the object at a second point among the at least two points.

4. The method as claimed in claim 1, wherein computing the cost function comprises:
generating a first point cloud based on a 3D reconstruction of the real-world visual content;
generating a second point cloud based on the simulation variant;
correlating the first point cloud and the second point cloud to generate a 3D Euclidean matrix; and
computing the cost function based on the correlation.

5. The method as claimed in claim 1, further comprising:
generating a simulated dataset in response to estimating the one or more physical properties associated with the object and an optimized simulation variant, using the 3D reconstruction, wherein the simulated dataset indicates simulated instances associated with manipulation of the object; and
training a computer vision machine learning (ML) model using the generated simulated dataset.

6. The method as claimed in claim 5, wherein generating the simulated dataset comprises:
generating a modified textured image based on adding a noise to a predefined texture image, wherein the modified textured image includes a representation of the object and the real-world environment for the 3D simulation;
associating the modified textured image with a texture node of the 3D reconstruction;
manipulating an illumination effect on the associated modified textured image based on adjusting lighting conditions to generate a plurality of scenes associated with the 3D reconstruction;
wrapping the associated generated modified textured image onto the object in the 3D reconstruction;
manipulating a plurality of input device parameters including at least one draft angle and at least one viewpoint angle based on a user input;
generating a synthetic 3D reconstruction by rendering at least one synthetic image of the real-world environment generated by incorporating the manipulated modified textured image and each of the plurality of input device parameters to reflect wrapping, manipulation of illumination effect, and chosen viewpoints for the 3D simulation; and
generating the simulated dataset for training the computer vision ML model based on the synthetic 3D reconstruction.

7. The method as claimed in claim 5, comprising:
performing domain adaptation based on few-shot learning using a set of data-points associated with the real-world environment, the optimized simulation variant and the computer vision ML model trained on the optimized simulation variant such that the trained computer vision ML model is adaptable to the real-world environment.

8. The method as claimed in claim 1, wherein the object is one of a flexible object or a non-flexible object.

9. The method as claimed in claim 1, wherein the capturing device is one of a camera or a 3D sensor.

10. A system for estimating one or more physical properties associated with an object, the system comprising:
a memory;
at least one processor in communication with the memory, the at least one processor is configured to:
generate a three-dimensional (3D) reconstruction of a real-world environment based on an input media from a capturing device;
estimate a current set of physical parameters associated with the object using a physics-based prediction model and a real-world visual content indicating a recorded media while the object is manipulated in the real-world environment;
generate a simulation variant corresponding to the manipulation of the object based on the 3D reconstruction and the current set of physical parameters;
compute a cost function based on comparing the simulation variant and the real-world visual content, wherein the cost function indicates dissimilarity between the simulation variant and the real-world visual content; and
estimate the one or more physical properties associated with the object based on optimizing the current set of physical parameters with the cost function such that a similarity between the simulation variant and the real-world visual content increases.

11. The system as claimed in claim 10, wherein to estimate the current set of physical parameters, the at least one processor is configured to:
capture the real-world visual content including a plurality of images while manipulating the object in the real-world environment;
transform each of the plurality of images into a corresponding simulated physical state associated with the object using an image encoder while manipulating the object;
determine an evolution of the simulated physical state of the object based on predicting at least one future frame; and
estimate the first set of physical parameters based on the evolution of the simulated physical state corresponding to each of the plurality of images.

12. The system as claimed in claim 11, wherein to manipulate the object, the at least one processor is configured to:
provide a set of instructions to a robot, wherein the set of instructions comprises:
pick the object from a first point among at least two points using a robot,
perform a manipulation action indicating at least one of compressing and stretching the object or move towards at least one of a left direction or a right direction while holding the object; and
drop the object at a second point among the at least two points.

13. The system as claimed in claim 10, wherein to compute the cost function, the at least one processor is configured to:
generate a first point cloud based on a 3D reconstruction of the real-world visual content;
generate a second point cloud based on the simulation variant;
correlate the first point cloud and the second point cloud to generate a 3D Euclidean matrix; and
compute the cost function based on the correlation.

14. The system as claimed in claim 10, the at least one processor is configured to:
generate a simulated dataset in response to estimating the one or more physical properties associated with the object and an optimized simulation variant, using the 3D reconstruction, wherein the simulated dataset indicates simulated instances associated with manipulation of the object; and
train a computer vision machine learning (ML) model using the generated simulated dataset.

15. The system as claimed in claim 14, wherein to generate the simulated dataset, the at least one processor is configured to:
generate a modified textured image based on adding a noise to a predefined texture image, wherein the modified textured image includes representation of the at least object and the real-world environment for the 3D simulation;
associate the modified textured image with a texture node of the second 3D representation;

manipulate an illumination effect on the associated modified textured image based on adjusting lighting condition to generate a plurality of scenes associated with the second 3D representation;

wrap the associated generated modified textured image onto the object in the second 3D representation;

manipulate a plurality of input device parameters including at least one draft angle and at least one viewpoint angle based on a user input; and generate the synthetic 3D reconstruction by rendering at least one synthetic image of the real-world environment generated by incorporating the manipulated modified textured image and each of the plurality of input device parameters to reflect wrapping, manipulation of illumination effect, and chosen viewpoints for the 3D simulation; and generate the simulated dataset for training the computer vision ML model based on the synthetic 3D reconstruction.

16. The system as claimed in claim 14, the at least one processor configured to:

perform domain adaptation based on few-shot learning using a set of data-points associated with the real-world environment, the optimized simulation variant and the computer vision ML model trained on the optimized simulation variant;

such that the trained computer vision ML model is adaptable to the real-world environment.

17. The system as claimed in claim 1, wherein the object is one of a flexible object or a non-flexible object.

18. The system as claimed in claim 10, wherein the capturing device is one of a camera or a 3D sensor.

* * * * *